June 4, 1929.                M. BELLER ET AL                1,715,635
                           SPEED INDICATING DEVICE
                      Filed May 27, 1927         2 Sheets-Sheet 1
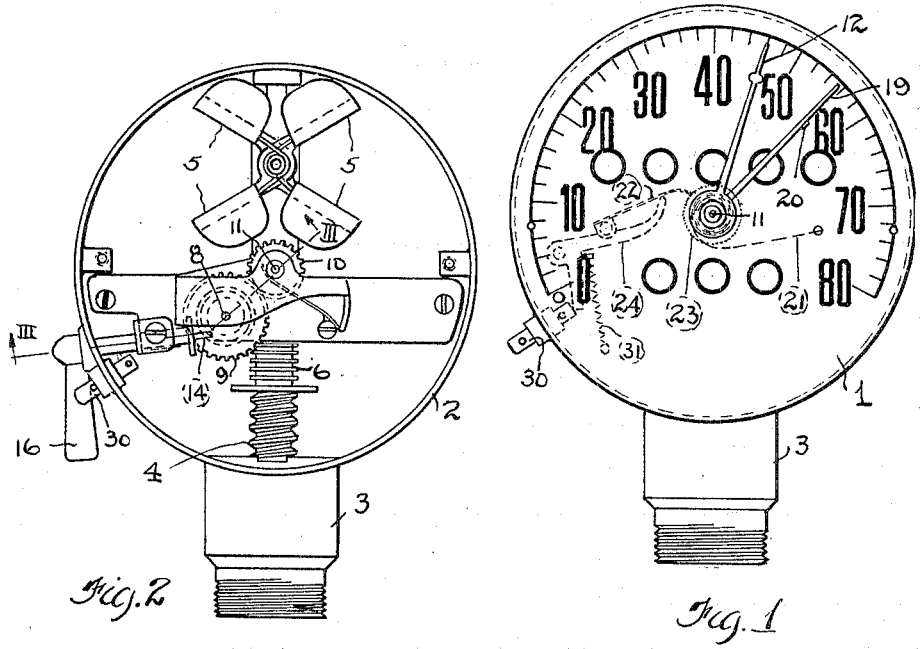
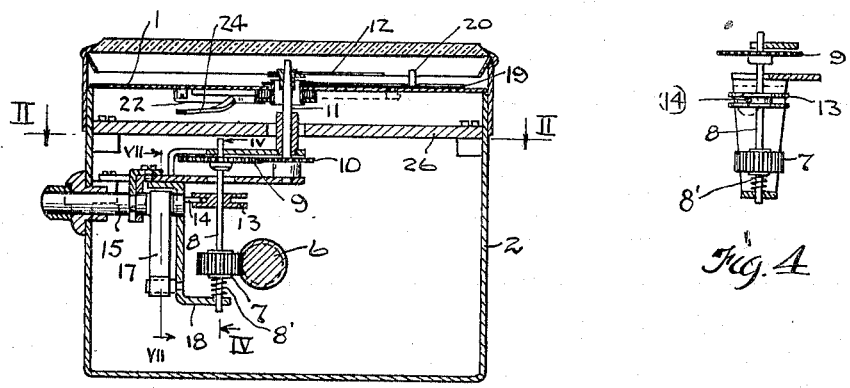
INVENTORS
Melchior Beller and
BY Carl F. Bauer
Fay, Oberlin & Fay
ATTORNEYS.

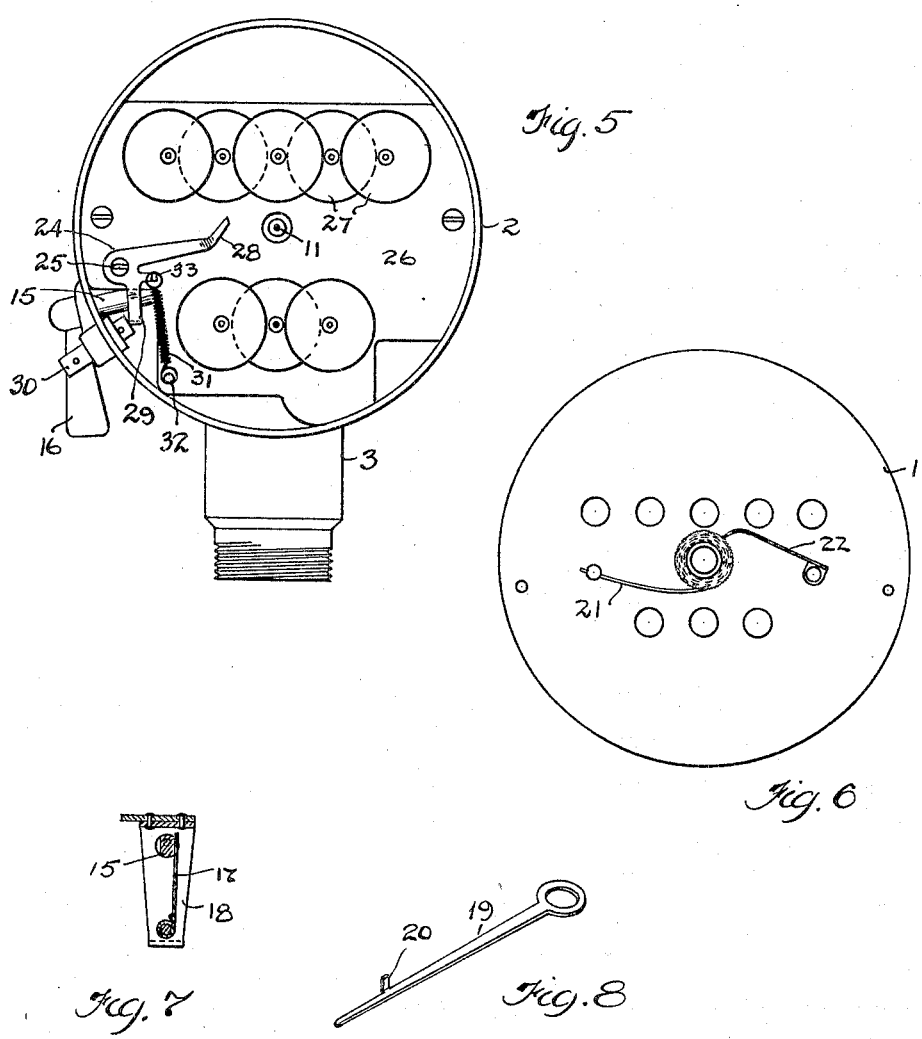

Patented June 4, 1929.

1,715,635

UNITED STATES PATENT OFFICE.

MELCHIOR BELLER AND CARL F. BAUER, OF CLEVELAND, OHIO, ASSIGNORS TO THE DUAL SPEEDOMETER COMPANY, OF CLEVELAND, OHIO, A CORPORATION OF OHIO.

SPEED-INDICATING DEVICE.

Application filed May 27, 1927. Serial No. 194,614.

In speed indicating devices, it is often desirable to obtain a definite indication of certain running speeds as well as the absolute maximum that might be reached. A highway officer, for instance, may be put to the necessity of distinguishing between the speed of a supposed violator and the speed represented in the spurt required to overtake such person, and in any case if such question be raised, it is a matter difficult of proof. Adequate separable registration is highly desirable, in fact, for any usage.

To the accomplishment of the foregoing and related ends, the invention, then, consists of the features hereinafter fully described, and particularly pointed out in the claims, the following description and the annexed drawings setting forth in detail certain mechanism embodying the invention, such mechanism being however, illustrative of but one of the various ways in which the principle of the invention may be employed.

In said annexed drawings:—

Fig. 1 is a face view of a speedometer embodying the present invention; Fig. 2 is a section taken on a plane indicated by the line II—II, Fig. 3; Fig. 3 is a section taken on a plane indicated by the line III—III, Fig. 2; Fig. 4 is a sectional detail taken on a plane indicated by the line IV—IV, Fig. 3; Fig. 5 is a face view with the dial removed; Fig. 6 is an elevational view of the reverse side of the dial; Fig. 7 is a sectional detail taken on a plane indicated by the line VII—VII, Fig. 3; and Fig. 8 is a perspective view of one of the pointers.

Referring more particularly to the drawing, the reference numeral 1 designates the dial of a speedometer, being secured to a casing 2 to which is attached a mounting bushing 3. For motor vehicle usage, a flexible chain drive connection from the pinion mechanism arranged adjacent the wheel serves to rotate the shaft 4 mounted in the speedometer casing, the detail of the driving means being generally in accordance with usual practice. The rotatable shaft 4, transmitting motion thus to be indicated, in turn actuates means for translating such motion into an arcuate thrust. The detail of such translating means may vary considerably as effects the present invention, it being sufficient here to indicate one form of convenient embodiment, namely the centrifugal type, comprising paired weights 5 mounted to move a connected member in proportion to the throw of the weights, as determined of course in proportion to their speed of revolution, and such motion in turn being communicated through a worm 6 to a worm gear 7 on the spindle 8. This spindle carries a gear 9 which normally meshes with the pinion 10 on a second spindle 11, the latter carrying at its free end a pointer or runing hand 12. Fixed on the spindle 8 is a grooved collar 13, in the groove of which there engages a pin 14 projecting from the end of a stem 15, which is mounted through the casing and is provided on its outer end with a thumb-lever 16, so as to be oscillably movable within a limited arc. A spring 8' is desirably provided about the spindle 8 inside the bracket. The stem 15 is provided with means for insuring retention in its respective oscillated positions, a preferable means to this end comprising a spring 17 bearing against squared surfaces on the stem. The spindle 8 is mounted in a bracket 18 to have longitudinal play within the limits imposed by the throw of the pin 14 as moved by the stem 15. Movement will thus be seen to be capable of meshing or unmeshing the gearing 9, 10, according as the spindle is pushed into one or the other of its positions.

Loose about the spindle 11, and back of the pointer or running hand 12 is another pointer or hand 19, this pointer being provided with an upstanding lug 20 which projects into the path of the pointer 12. The hand 19 is provided with a coil spring 21 which normally tends to hold it at zero position. Means for braking or retaining this hand however at furthest advanced position is provided, such means being for instance in the form of a dog 22 engaging the ratchet 23 attached to the hand 19. Thus far it will be seen that as the running hand 12 advances, it will engage the lug 20 on the hand 19 thereby pushing the latter ahead, its advanced position being then maintained by the dog 22. For releasing, a bell crank lever 24 is provided, being pivoted as at 25 on the plate 26 which carries the odometer train of gearing and number-displaying disks 27, these forming no part of the present invention. The one arm 28 of the bell crank lever extends into a path capable of engaging the dog 22, while the other arm 29 extends into the path of a push-element 30 which is normally held out by spring means, conveniently a coil spring 31 anchored at one end 32 to the odometer support-plate, and at the other end engaging a hook or lug 33 on the bell crank lever, such spring thus serving to maintain the lever and the push-element both in retracted position.

In operation, with the shaft 4 rotating as actuated by its connecting mechanism, its rotary motion is translated through the centrifugal or other translating means, into an arcuate thrust indicated by the running hand 12, and the position of such hand on the calibrated dial 1 will at all times be in proportion to the speed. Normally such hand will travel up or down therefore in accordance with the speed. As the hand advances over the dial however, it will be observed that it will engage the lug 20 on the hand 19, and correspondingly push the latter hand also, but by reason of the pawl and ratchet action exerted by the dog 22 and ratchet 23, the hand 19 will be retained at its furthest advanced position each time, and thus act as a maximum-indicating hand, although the running hand 12 recedes back to zero as the speed correspondingly drops. A register of the maximum speed is thus had. Where it is desired to secure a more permanent registration of any particular speed shown by the running hand 12, the thumb-lever 16 is rocked to push the collar 13 and its spindle 8 to position to unmesh the gearing 9, 10, whereby the hand 12 is immediately stopped at its position then occupied. In this manner, a register of a desired running speed, as for instance in pacing is to be had. To reset both hands to zero, the thrust element 30 is pushed, this actuating the bell crank lever 28, 29, the arm 28 raising the dog 22 from the ratchet, whereupon the coil spring 21 attached to the bushing of the hand 19 and thus under tension as the hand is advanced over the dial, correspondingly turns the hand 19 back, and as the lug 20 also engages the hand 12, the latter is at the same time thrown around back to zero.

Other modes of applying the principle of the invention may be employed, change being made as regards the details disclosed, provided the means stated in any of the following claims, or the equivalent of such, be employed.

We therefore particularly point out and distinctly claim as our invention:—

1. In a speed-indicating device, the combination of a rotatable shaft adapted to transmit motion rate to be indicated, means for translating such motion to a movable index therefor, and optionally actuable means for stopping and maintaining said index at any point of speed indication as desired by disconnecting from the drive.

2. In a speed-indicating device, the combination of a rotatable shaft adapted to transmit motion rate to be indicated, means for translating such motion to a movable index therefor, optionally actuable means for stopping and maintaining said index at any point of speed indication as desired by disconnecting from the drive, and an additional index actuated from the translating means for indicating the maximum speed.

3. In a speed-indicating device, the combination of a rotatable shaft adapted to transmit motion rate to be indicated, means for translating such motion, said means including a spindle, two-movable indexes deriving movement from said spindle, means for retaining one thereof in furthest advanced position, optionally controllable means for stopping and retaining the other when desired, and means for resetting both.

4. In a speed-indicating device, the combination of a rotatable shaft adapted to transmit motion rate to be indicated, means for translating such motion to a movable index, said means including a spindle, another spindle driven by the first mentioned spindle, and means for preserving a registration of any speed as desired, said means including a means for interrupting the drive between said spindles.

5. In a speed-indicating device, the combination of a rotatable shaft adapted to transmit motion to be indicated, means for translating such motion into an arcuate thrust, said means including a spindle, two index hands, one loose and one fixed on said spindle, means for retaining one of the hands in furthest advanced position, a lug whereby said hands may interengage, optionally controllable means for stopping and retaining the other hand when desired, and means for resetting both hands.

6. In a speed-indicating device, the combination of a rotatable shaft adapted to transmit motion to be indicated, means for translating such motion to a movable index, said means including a spindle, a second spindle, driving gearing therebetween, and means for preserving a registration of any speed as desired, said means including a means for disengaging the gearing.

7. In a speed-indicating device, the combination of a rotatable shaft adapted to transmit motion to be indicated, means for translating such motion into an arcuate thrust, said means including a spindle, a second spindle, driving gearing therebetween, a running index hand on said second spindle, and optionally controllable means for stopping and retaining said running hand, said means including a grooved collar secured to the first mentioned spindle, and a stem for engaging said collar adapted to shift the gearing in and out of mesh.

8. In a speed-indicating device, the combination of a casing, a rotatable shaft adapted to transmit motion to be indicated, means for translating such motion into an arcuate thrust, said means including a spindle, a second spindle, gearing therebetween, a running index hand on said second spindle, and optionally controllable means for stopping and retaining said running hand, said means including a grooved collar secured to the first mentioned spindle, a stem journaled through said casing, an eccentric pin in the end of said stem and engaging in the groove of said collar, and a thumb-lever on the outer end of the stem whereby said stem may be turned to mesh or unmesh the gearing between spindles.

9. In a speed-indicating device, the combination of a casing, a rotatable shaft adapted to transmit motion to be indicated, means for translating such motion into an arcuate thrust, said means including a spindle, a second spindle, gearing therebetween, a running index hand on said second spindle, and optionally controllable means for stopping and retaining said running hand, said means including a grooved collar secured to the first mentioned spindle, a stem journaled through said casing, an eccentric pin in the end of said stem and engaging in the groove of said collar, a thumb-lever on the outer end of the stem whereby said stem may be turned to mesh or unmesh the gearing between spindles, and resilient means for retaining the stem in either of its positions.

10. In a speed-indicating device, the combination of a rotatable shaft adapted to transmit motion to be indicated, means for translating such motion into an arcuate thrust, said means including a spindle, a maximum indicating hand loose about said spindle, a running hand fixed to said spindle, means whereby the running hand may move the maximum hand, positive retaining means for holding the maximum hand in furthest advanced position, a spring tending to turn the maximum hand toward zero, and means for releasing said retaining means, said means including a lever with a push-piece accessible through the casing and engageable against said retaining means.

Signed by us this 20th day of May, 1927.

MELCHIOR BELLER.
CARL F. BAUER.